(12) United States Patent
Beishon (10) Patent No.: US 8,579,631 B2
(45) Date of Patent: Nov. 12, 2013

(54) CLEAN REAL SMOKE FIRE SIMULATOR

(76) Inventor: Dan Beishon, Northampton (GB)

( * ) Notice: Subject to any disclaimer, the term of this patent is extended or adjusted under 35 U.S.C. 154(b) by 534 days.

(21) Appl. No.: 12/794,344

(22) Filed: Jun. 4, 2010

(65) Prior Publication Data

US 2010/0248196 A1 Sep. 30, 2010

Related U.S. Application Data

(60) Provisional application No. 61/184,351, filed on Jun. 5, 2009.

(51) Int. Cl.
*G09B 19/00* (2006.01)

(52) U.S. Cl.
USPC .......................................................... 434/226

(58) Field of Classification Search
USPC ...................................... 434/226; 472/65, 66
See application file for complete search history.

(56) References Cited

U.S. PATENT DOCUMENTS

| | | | |
|---|---|---|---|
| 2,532,260 A * | 11/1950 | Lipton | 96/315 |
| 3,199,436 A * | 8/1965 | Rasmussen et al. | 99/331 |
| 4,459,219 A * | 7/1984 | Kiley | 516/2 |
| 4,526,548 A | 7/1985 | Livingston | |
| 4,568,820 A * | 2/1986 | Swiatosz | 392/397 |
| 4,871,115 A * | 10/1989 | Hessey | 239/136 |
| 5,226,818 A * | 7/1993 | Feiock et al. | 434/226 |
| 5,316,484 A * | 5/1994 | Layton et al. | 434/226 |
| 5,320,536 A * | 6/1994 | Rogers et al. | 434/226 |
| 5,345,830 A * | 9/1994 | Rogers et al. | 73/866 |
| 5,367,603 A * | 11/1994 | Wenrich et al. | 392/394 |
| 5,374,191 A * | 12/1994 | Herman et al. | 434/226 |
| 7,008,230 B2 | 3/2006 | Hoglund | |
| 7,578,225 B2 * | 8/2009 | Bosch et al. | 89/11 |
| 2003/0121672 A1 * | 7/2003 | Spaniol et al. | 169/5 |
| 2005/0233289 A1 * | 10/2005 | Hoglund | 434/226 |
| 2006/0199130 A1 * | 9/2006 | Findley | 431/350 |

* cited by examiner

*Primary Examiner* — Gene Kim
*Assistant Examiner* — Alyssa Hylinski
(74) *Attorney, Agent, or Firm* — Vincent G. LoTempio; Kloss, Stenger & LoTempio; David T. Stephenson (57) ABSTRACT

A simulator for use in firefighting training exercises comprising a fire compartment having a flame; a means for generating a flame; a means for generating smoke into the fire compartment; a control room for controlling the means for generating a flame and the means for generating smoke; a means for expelling the smoke from the fire compartment; a means for oxidizing the smoke; and a stack for releasing the oxidized smoke from the oxidizing means.

21 Claims, 7 Drawing Sheets

CLEAN REAL SMOKE FIRE SIMULATOR

This application claims priority of U.S. Provisional Patent Application of Dan Beishon, Ser. No. 61/184,351 for CLEAN REAL SMOKE FIRE SIMULATOR, filed on Jun. 5, 2009.

BACKGROUND OF THE INVENTION

1. Field of the Invention

This patent application relates to a clean, real smoke fire simulator used to train firefighting personnel in a realistic scenario. More specifically this patent application relates to a fire simulator which uses smoke generated from combusting flammable material, and not synthetic, artificial smoke. Further, this patent application provides a fire simulator which uses smoke generated from combusting flammable material followed by air treatment to clean the smoke before the cleaned smoke is released into the environment thereby reducing pollutant gas emissions to the environment. More specifically, this air treatment uses a thermal oxidizer to eliminate visible smoke emissions and reduce environmental impact of the released air.

2. Background

When training firefighting personnel, it is important to provide training scenarios that are as realistic to an actual fire emergency as possible. Thus, an effective scenario will have flames, smoke, heat, sounds, and obstacles. Current training regimes use a variety of simulation techniques. The most realistic is to create an actual fire situation. However, although in an arguably controlled environment, due to the unpredictable nature of fire, this approach creates a high possibility of danger to firefighters without complete operative control over the situation. Also, this is likely cost prohibitive as the structure is destroyed and will need to be rebuilt to train additional personnel. Further, this burning produces large amounts of smoke and particulates which are directly released into the environment.

A second training approach creates a fire situation having an active flame with the simulator filled with artificial smoke. This allows greater control over the training environment reducing possibilities of injury during training. However, the artificial smoke is generated from chemicals that produce smoke that is non toxic but does not behave in the same way as smoke generated from carbonaceous materials usually encountered in real fire situations, thus making the training session of limited value. U.S. Pat. No. 4,526,548 discloses a trailer having multiple rooms for fire training purposes where each room can be supplied with artificial smoke. Besides the drawback of using artificial smoke, the system used in the '548 patent ventilates the smoke directly into the atmosphere without cleaning or reducing the amount of particulates before release. Direct ventilation of smoke containing toxic particles to the atmosphere increases air pollution and negatively impacts the environment A third approach to training firefighters is to create a fire using a controllable gas-fired burner, usually using propane gas, while supplying a more realistic smoke than artificial smoke. An example of a system utilizing this approach is described in U.S. Pat. No. 5,320,536 assigned to Symtron Systems, Inc. The '536 patent discloses a smoke generation means utilizing a hydraulic fluid. The fluid is designed to be non-toxic and to behave more realistically than artificial smoke. Nevertheless, the smoke generated by this fluid does not have the same properties as smoke found at an actual fire emergency. The artificial smoke generated by hydraulic fluid behaves differently and thus limits the educational applicability in this trainer system. Moreover, the system taught by this patent negatively impacts the environment by emitting toxic smoke to the atmosphere. U.S. Pat. No. 7,008,230 assigned to Superior Simulation Technologies uses oil dripped onto a hot plate to generate thick smoke which is delivered to the simulator using fans. Although this system generates more realistic smoke than the other described systems, the device described in the '230 patent negatively impacts the environment by releasing untreated toxic smoke directly to the atmosphere. Indeed, a portion of the training using the simulator of the '230 patent involves trainers evacuating smoke from the simulator into the atmosphere. Further, neither the '536 nor '230 system recirculates smoke within the trainer apparatus requiring a greater amount of fuel to be used while also creating a greater amount of smoke that pollutes the environment.

Thus, it can be seen that a fire training simulator is needed which provides a live flame for trainee training while also generating real smoke. Additionally, to reduce the environmental impact of the training, a smoke recirculation means is required to minimize fuel use and smoke generation while a clean-up system is needed to clean the smoke before the gases are ultimately released into the atmosphere thereby reducing pollutant gas emissions typically expelled during the training of firefighting personnel.

SUMMARY OF THE INVENTION

It is accordingly an object of the present disclosure is to provide a clean, environmentally friendly real smoke fire simulator having a controlled flame to represent a real fire situation that reduces pollutant gas emissions.

A further object of the present disclosure is to provide a clean, real smoke fire simulator that further comprises a real smoke generator to create real smoke which is then controllably introduced into the simulator.

Still a further object of the present disclosure is to provide a clean, real smoke fire simulator where the smoke created by the smoke generator is controllably recirculated within the simulator during a training session to conserve energy.

Still another object of the present disclosure is to provide a clean, real smoke fire simulator having an airlock entry and exit system to prevent uncleaned smoke from being emitted to the atmosphere thereby reducing pollutant gas emissions.

Yet another object of the present disclosure is to provide a clean, real smoke fire simulator that further comprises a thermal oxidizer integrated into the system to oxidize the smoke before emitting the cleaned gas to atmosphere to thus improve the environment by reducing pollutant gas emissions.

Yet a further object of the present disclosure provides a clean, real smoke fire simulator that further comprises a computer control system to provide automatic control of the simulator system.

A further object of the present disclosure provides a clean, real smoke fire simulator that further comprises additional features such as flashover effects, sound effects, stress heating, lighting effects, and physical obstructions.

The above and other objects are accomplished in accordance with the present disclosure which comprises a clean real smoke fire simulator comprising: a fire compartment having a target fire; at least one airlock chamber leading from atmosphere to the fire compartment; a smoke generation apparatus having means for introducing smoke into the fire compartment; a smoke oxidizing system; and a control room. The present disclosure may further comprise a sound system and other effects systems.

BRIEF DESCRIPTION OF THE DRAWINGS

The present disclosure and the manner in which it may be practiced is further illustrated with reference to the accompanying drawings wherein.

DESCRIPTION OF SPECIFIC EMBODIMENTS

At the outset, it should be clearly understood that reference numerals are intended to identify the information found in the block diagrams in the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

To properly train firefighters, it is important to teach firefighting skills in a controlled environment, but to have that environment be as similar to a "real world" fire emergency as possible. Ideally, training is conducted within a simulator where the size and heat of the flame is controlled to prevent injuries or accidents with limited impact on the environment by reducing pollutant emissions and conserving energy. This flame is created near common household sources of a fire emergency, such as the range top, clothes dryer, or the bed or sofa where dropped cigarettes frequently cause fires. A dedicated control room within the simulator regulates the size and heat of the flame. Additionally, a thick, dense smoke filled with particulates is also necessary to simulate the smoke conditions found at a typical fire emergency. The smoke introduced and maintained within the simulator is also controlled via the simulator's control room. To minimize environmental impact, the fire simulator uses a high efficiency liquid propane gas burner operating to produce low emissions of carbon dioxide, nitrogen-oxygen gases and aromatic hydrocarbon gases. Further, the smoke generated is oxidized in a dedicated thermal oxidizer compartment before being released into the atmosphere and smoke is also recirculated for the purpose of conservation of energy. The thermal oxidizer incinerates the waste gases from the system and converts carbon monoxide and volatile organic compounds into carbon dioxide and water. Additionally, firefighting personnel enter and exit the simulator's fire fighting room through an airlock chamber which is held at a slightly higher ambient pressure than the fire training room. The slightly higher ambient pressure in the airlocks prevents smoke from escaping the fire training room when personnel enter or exit the fire training room.

Figure 1:
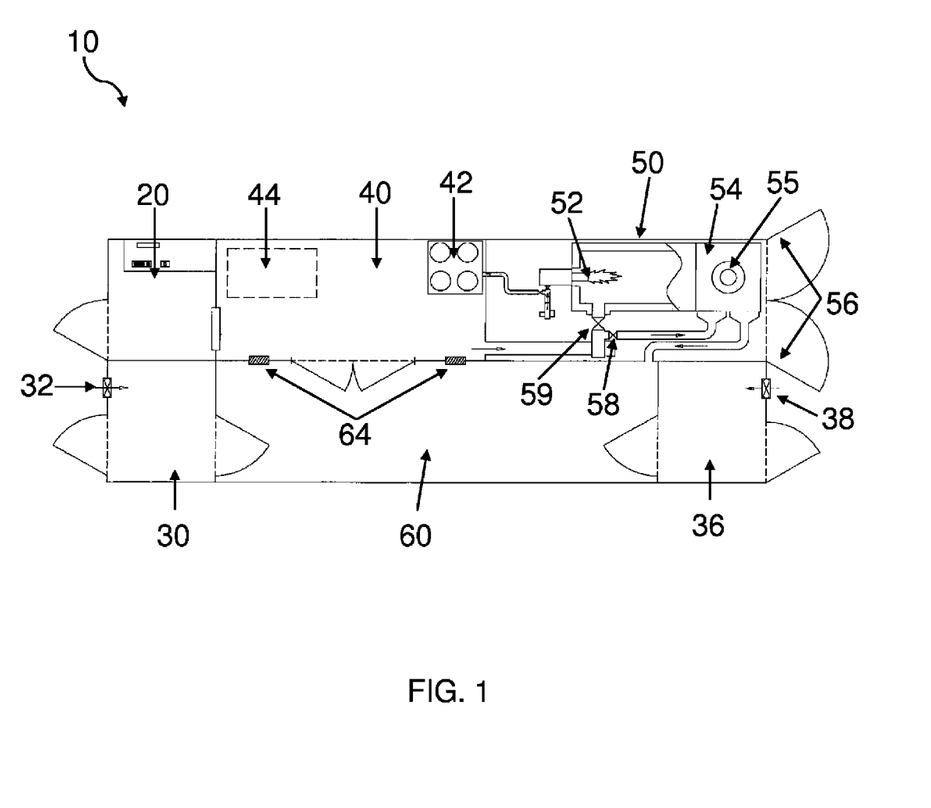
FIG. 1 is a top view of one embodiment of the present disclosure.

Adverting now to the drawings, with reference to FIG. 1, an embodiment of the present disclosure is indicated generally by numeral 10. Fire training simulator 10 comprises a fire compartment 40 accessed through ready compartment 60; ready compartment 60 entered by passing through airlock compartment 30 or 36; smoke oxidizing compartment 50; and control room 20.

In operation, firefighters enter fire compartment 40 by passing through ready compartment 60. Ready compartment 60 is entered through airlock compartments 30 and 36. Airlock compartments 30 and 36 are maintained at slightly higher pressure than ready compartment 60 by using fans 32 and 38, respectively. The higher pressure in chambers 30 and 36 prevents any smoke in ready compartment 60 from being released into the environment when the airlocks are opened to admit or exit trainees. Fire compartment 40 is insulated to retain heat within the fire compartment and to protect trainees from the heat while in the ready compartment, as well as to protect the systems controls in control room 20. Fire compartment 40 can be equipped with a controllably sized gas fired flame representing a fire situation.

A live flame is generated by cooker 42. Smoke is generated using smoke crib 44 which is configured to generate thick particulate smoke similar to that found at an actual fire situation. Smoke crib 44 is further equipped with a control system to regulate the amount of smoke released into fire compartment 40. Smoke is preferably generated by burning straw or organic oil, or any other material producing smoke with the desired "real smoke" characteristics. Optionally, smoke can be generated in a separate chamber (not shown) and controllably directed into fire compartment 40. Smoke and heat are recirculated through recirculation unit 54 located in oxidizing compartment 50. Smoke and heat are directed to the recirculation unit by a first control valve 58. Smoke passes to ready compartment 60 via a return line and back to fire compartment 40 through vents 64. Fire compartment 40 is under negative pressure so that any smoke in the system will be sucked into compartment 40. Recirculating smoke increases smoke generation efficiency while decreasing the demand made on smoke oxidizer 52 thus limiting the impact on the environment by conserving energy. A second control valve 59 allows smoke to pass into smoke oxidizer 52.

In an embodiment of the present disclosure, the smoke is incinerated when it is held at about 815° C. with a residence time of about 2 seconds in the smoke oxidizer before being expelled through stack 55. Control valves 58 and 59 may both be partially open during training to allow some smoke into the oxidizer and some to be recirculated. Importantly, smoke passing through valve 58 does not exit through stack 55, but is recirculated to fire chamber 40. Only smoke that is cleaned by traveling through smoke oxidizer 52 is expelled into the atmosphere thereby limiting the system's environmental impact. Doors 56 allow access to oxidizing chamber 50. Operational control of the entire system is maintained and directed by personnel in control room 20. Additional system controls can be housed in control room 20, including but not limited to a sound system, system for lighting effects, or any other system to produce an effect desired to provide a more realistic training scenario. Lights controlled by an optional lighting system are located in fire compartment 40.

Figure 2:
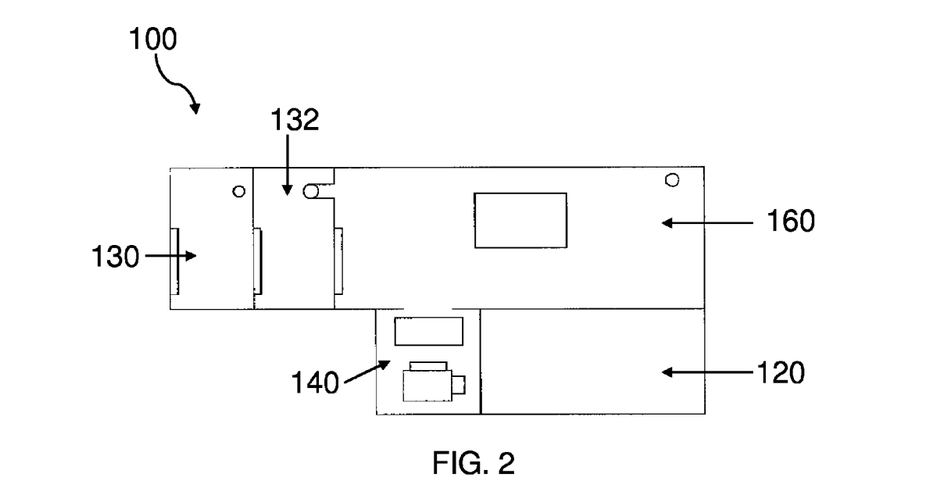
FIG. 2 is a top view of a second embodiment of the present disclosure.
Figure 3:
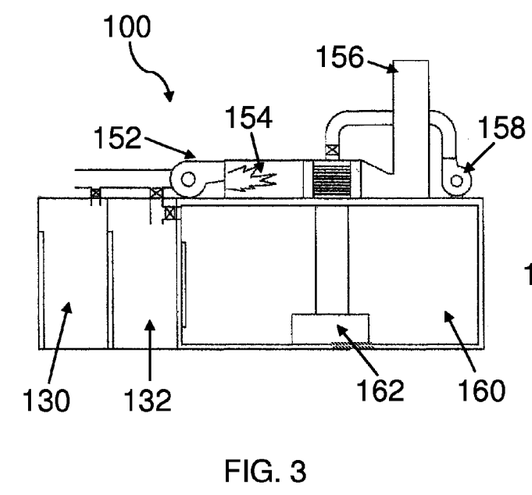
FIG. 3 is a side view of a second embodiment of the present disclosure.
Figure 4:
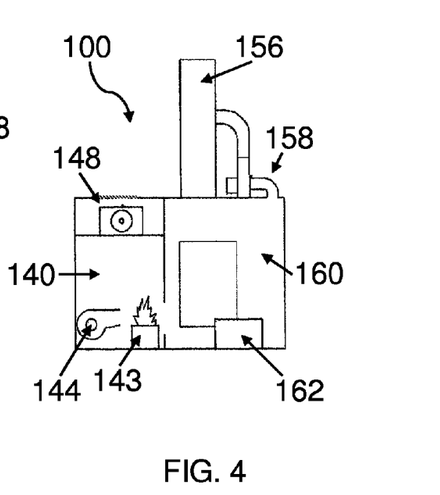
FIG. 4 is an end view of a second embodiment of the present disclosure.

A second embodiment is generally indicated by numeral 100 in FIGS. 2 through 4. As shown in FIG. 2, this embodiment comprises fire compartment 160 which is accessed by passing through airlock compartments 130 and 132. Airlock compartments 130 and 132 are maintained at a lower pressure than fire compartment 160. This lower pressure will draw any smoke that escapes the system while compartments 130 and/ or 132 are opened to admit or exit trainees and direct the smoke to a smoke oxidizing system (as shown in FIG. 3). Smoke is created in smoke generation compartment 140 and passes through to fire compartment 160. Fire compartment 160 further contains an active gas fired flame of controllable size representing a fire scenario. Smoke is created by burning a suitable organic compound, such as but not limited to straw or oil. Simulator systems are monitored and controlled by computers and personnel located in control room 120. Additional system controls can be housed in control room 120, including but not limited to a sound system, system for lighting effects, or any other system to produce an effect desired to provide a more realistic training scenario. Lights controlled by an optional lighting system are located in fire compartment 160.

FIG. 3 is a side view of the simulator of an embodiment of the present disclosure showing airlock compartments 130 and 132 and fire compartment 160. Airlock compartment 130 is used to assemble the training party. Fire compartment 160 contains an active gas fired flame 162 of controllable size representing a fire scenario. Housed on top of fire compartment 160 are smoke oxidizer 154 and blower 152. An optional stack 156 directs gases from cleaned smoke into the environment. Blower 152 draws in fresh air, as well as drawing air from airlock compartments 130 and 132, to feed oxidizer 154. A second blower 158 recirculates smoke from fire compartment 160 and heat from oxidizer 154 back into fire compartment 160 during a training session. When a training session is complete, particulate smoke is cleaned by oxidizer 154. In an embodiment of the present disclosure, the smoke is oxidized at about 815° C. for a total residence time of about 2 seconds before the cleaned gases are passed to the outside environment.

FIG. 4 is an end view of an embodiment of the present disclosure showing fire compartment 160 with a gas fired flame of controllable size 162, smoke recirculation blower 158 and associated piping, optional stack 156, and smoke generating compartment 140. Smoke generation compartment 140 houses crib 143 which contains any suitable organic material to be burned to produce particulate smoke, such as but not limited to straw or oil. Smoke created by burning material in the crib is controllably directed into fire compartment 160 using blower 144. FIG. 4 also shows an optional, additional compartment 148 which can house a heater to add extra heat to fire compartment 160.

Figure 5:
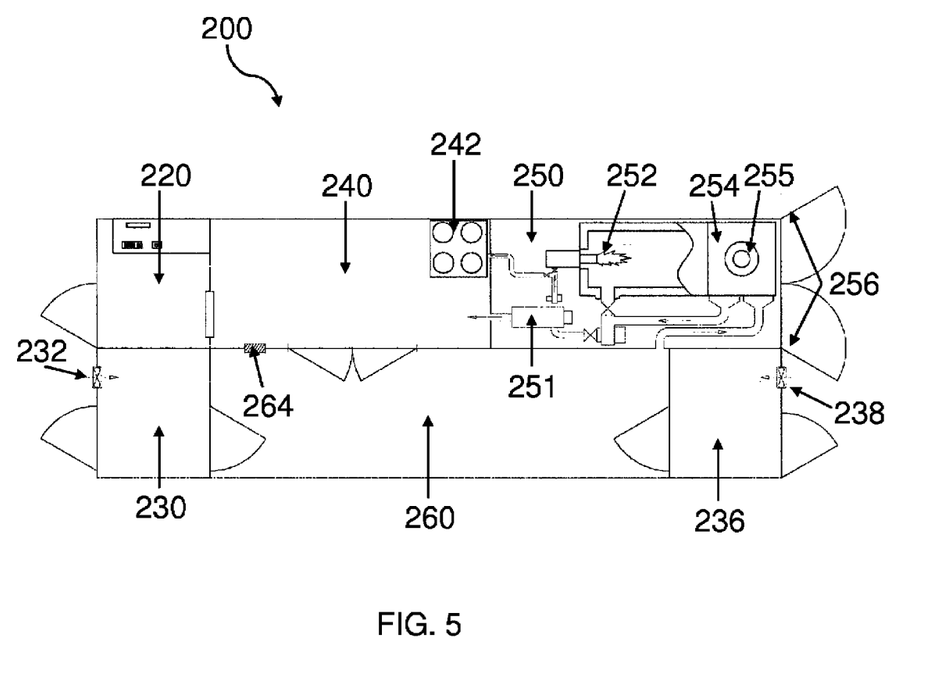
FIG. 5 is a top view of a third embodiment of the present disclosure.

A third embodiment of the present disclosure is shown generally as numeral 200 in FIG. 5. This embodiment comprises a fire compartment 240 accessed through ready compartment 260; ready compartment 260 entered by passing through airlock compartment 230 or 236; smoke generating and smoke oxidizing compartment 250; and control room 220.

In operation, firefighters enter fire compartment 240 by passing through ready compartment 260. Ready compartment 260 is entered through airlock compartments 230 and 236. Airlock compartments 230 and 236 are maintained at slightly higher pressure than ready compartment 260 by using fans 232 and 238, respectively. The higher pressure in chambers 230 and 236 prevents any smoke in ready compartment 260 from being released into the environment when the airlocks are opened to admit or exit trainees. Fire compartment 240 is insulated to retain heat within the fire compartment and to protect trainees from the heat while in the ready compartment, as well as to protect the systems controls in control room 220. Fire compartment 240 can be equipped with a controllably sized gas-fired flame in cooker 242 representing a fire situation.

Smoke is generated using a smoke generator 251 which can generate thick particulate smoke similar to that found at an actual fire situation. Smoke generator 251 is further equipped with a control system to regulate the amount of smoke released into fire compartment 240. Smoke is generated by burning straw or organic oil, or any other material producing smoke with the desired characteristics. Generated smoke is then controllably directed into fire compartment 240. Smoke and heat are recirculated through recirculation unit 254 located in smoke generation and smoke oxidizing compartment 250. Smoke passes to ready compartment 260 from fire compartment 240 via vent 264 where it is directed to recirculation unit 254. The smoke is either recirculated into fire compartment 240 using smoke generator 251, or is directed into smoke oxidizer 252 for cleaning before being released into the atmosphere. Recirculating smoke increases smoke generation efficiency while decreasing the demand made on smoke oxidizer 252.

Before the smoke is released into the environment it is directed into smoke oxidizer 252 for the purpose of removing all particulate toxic compounds. In one embodiment of the present disclosure, the smoke is held at about 815° C. with a residence time of 2 seconds before being expelled through stack 255. Only smoke that has gone through smoke oxidizer 252 and been cleaned is expelled into the atmosphere thereby reducing the environmental impact of the system. Doors 256 allow access to oxidizing chamber 250. Operational control of the entire system is maintained and directed by personnel in control room 220. Additional system controls are housed in control room 220, including but not limited to a sound system, system for lighting effects, or any other system to produce an effect desired to provide a more realistic training scenario. Lights controlled by an optional lighting system are located in fire compartment 240.

Figure 6:
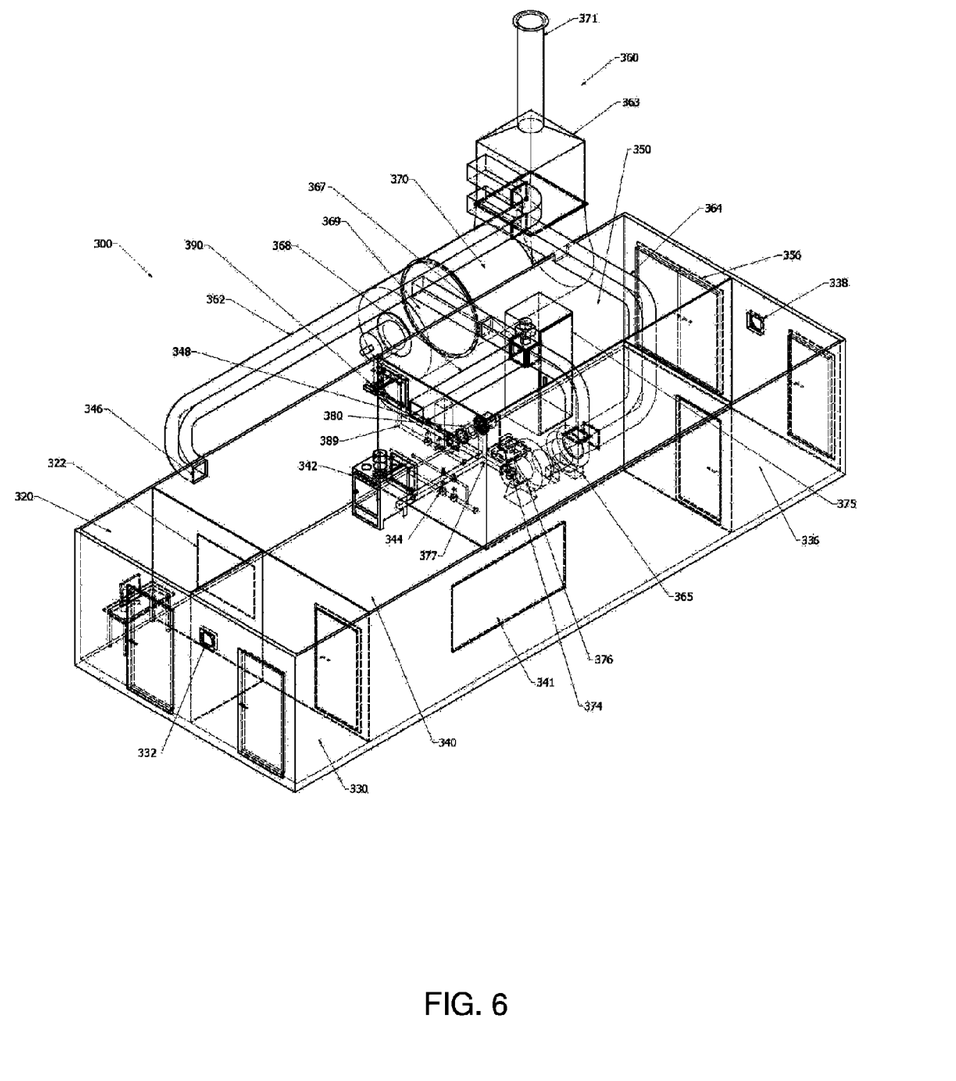
FIG. 6 is a perspective view of a fourth embodiment of the present disclosure.

A fourth embodiment of the present disclosure is shown generally as numeral 300 in FIG. 6. In this embodiment, the fire simulator comprises a fire compartment 340 accessed through airlock compartment 330 or 336; smoke generating compartment 350; smoke oxidizing unit 360; and control room 320.

In operation, firefighters enter fire compartment 340 by passing through either airlock compartment 330 or 336. Preferably, one airlock compartment is generally used to enter the fire compartment while the second airlock compartment is used to exit personnel from the fire compartment. Airlock compartments 330 and 336 are maintained at slightly higher pressure than fire compartment 340 by using fans 332 and 338, respectively. The higher pressure in chambers 330 and 336 prevents any smoke from being released into the environment when the airlocks are opened to admit or exit trainees. Fire compartment 340 is insulated to retain heat within the fire compartment and to protect the system's controls in control room 320. Fire compartment 340 can be equipped with a controllably sized gas-fired flame in cooker 342 representing a fire situation. The size and heat of the fire created by cooker 342 is controlled by the amount of gas, preferably liquid propane gas, supplied by regulators 344. Although propane gas is preferred, any suitable flammable gas may be used. The interior of fire compartment 340 can be viewed from outside through window 341 and from within control room 320 through window 322.

Smoke generation compartment 350 houses smoke generator 380 and a number of fans and associated ductwork for controlling flow of the smoke. Smoke is generated using a smoke generator 380 which generates a thick particulate smoke similar to that found at an actual fire situation. Smoke is generated by oil, preferably diesel oil although any suitable hydrocarbon fuel could be used, which is supplied to smoke generator 380 by oil pump skid 374. Oxygen for burning the oil is supplied by combustion air fan 376. Smoke generator 380 regulates the ratio of oil to air thereby controlling the quality of the produced smoke. Air (oxygen) is regulated to ensure incomplete combustion of the organic material (oil) thereby generating a black, particulate smoke containing, among other products, solid carbon (soot). Combustion air fan 376 also supplies oxygen to cooker 342 and oxidizing burner unit 369 through combustion air duct 377. Generated smoke is then controllably directed into fire compartment 340 by passing through re-entry duct 368 and out vent 348. Smoke and heat are recirculated by passing through a series of ducts and a heat exchanger unit. Heat exchanger unit 363 heats the recycled smoke/air stream to increase the temperature in the fire compartment 340 making the training more realistic. This heat recovery improves the environmental performance of the system as the heat does not need to be generated by other means. Smoke from the fire compartment 340 enters return duct 362 through vent 346. Return duct 362 delivers the smoke to heat exchange unit recirculation unit 363 where it then enters recirculation duct 364. Air flow carrying the smoke is maintained by exhaust/recirculating fan 365. Exhaust valve 367 directs whether, and to what extent, smoke is recirculated to the fire compartment 340. Smoke that is not redirected into fire chamber 340 passes into burner 369 and oxidizer 370 for cleaning before being released into the atmosphere. Recirculating smoke increases smoke generation efficiency while decreasing the demand made on smoke oxidizer.

Smoke is directed into smoke oxidizer 370 for the purpose of removing all particulate toxic compounds. The smoke is held at about 815° C. with a residence time of about 2 seconds before being expelled through stack 371 thus reducing pollutant gas emissions to the environment as smoke is oxidized and cleaned by the removal the "toxic" gases and leaving behind mainly $CO_2$ and water vapor. Only cleaned smoke that has gone through smoke oxidizer 370 is expelled into the atmosphere. Oxidizer 370 achieves extremely high destruction efficiency of high concentrations of pollutants in the waste gas. This includes emissions from the fire simulator burner 369. Control panel 375 regulates the speed of combustion air fan 376, exhaust/recirculation fan 365, as well as the gas supplied by regulators 344 and the oil delivered by oil pump skid 374. Doors 356 allow access to smoke generation chamber 350. Operational control of the entire system is maintained and directed by personnel in control room 320. Additional system controls can be housed in control room 320, including but not limited to a sound system, system for lighting effects, or any other system to produce an effect desired to provide a more realistic training scenario. Lights controlled by an optional lighting system are located in fire compartment 340.

Figure 7A:
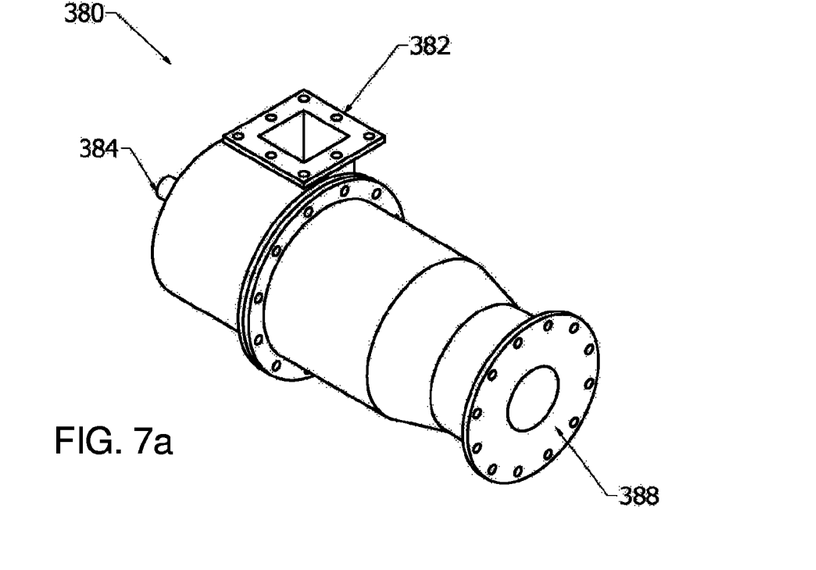
FIGS. 7a and 7b are detailed views of a smoke generator used in embodiments of the present disclosure.
Figure 7B:
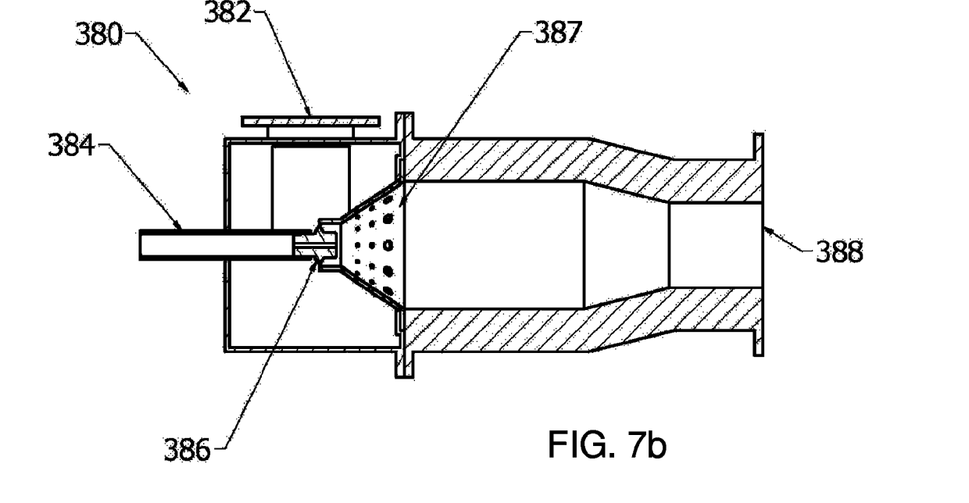

FIG. 7 is an expanded view of the smoke generator 380. Air enters the generator through combustion air inlet 382 and mixes with oil from nozzle 386 supplied via oil connection 384. The ratio of air-to-gas determines the extent of combustion which directly controls the quality of the smoke generated. Combustion of the oil expands through cone 387 and the generated smoke passes through outlet 388 to enter fire chamber 340 (See FIG. 6).

Figure 8A:
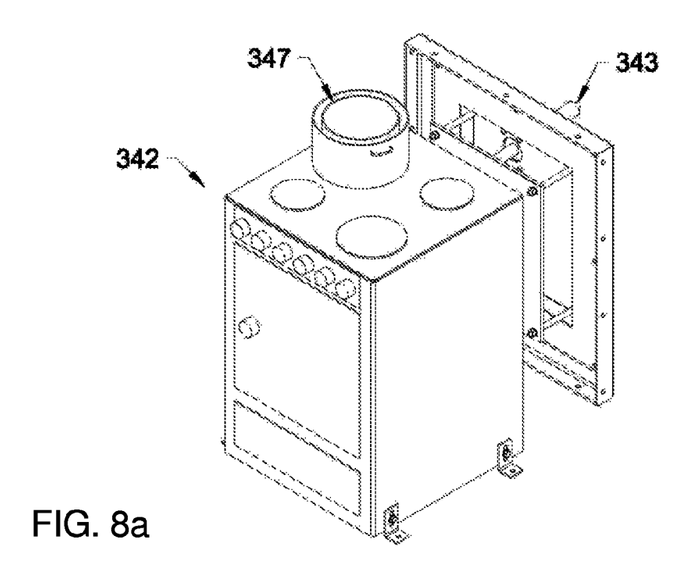
FIGS. 8a and 8b are detailed views of a cooker unit used in embodiments of the present disclosure.
Figure 8B:
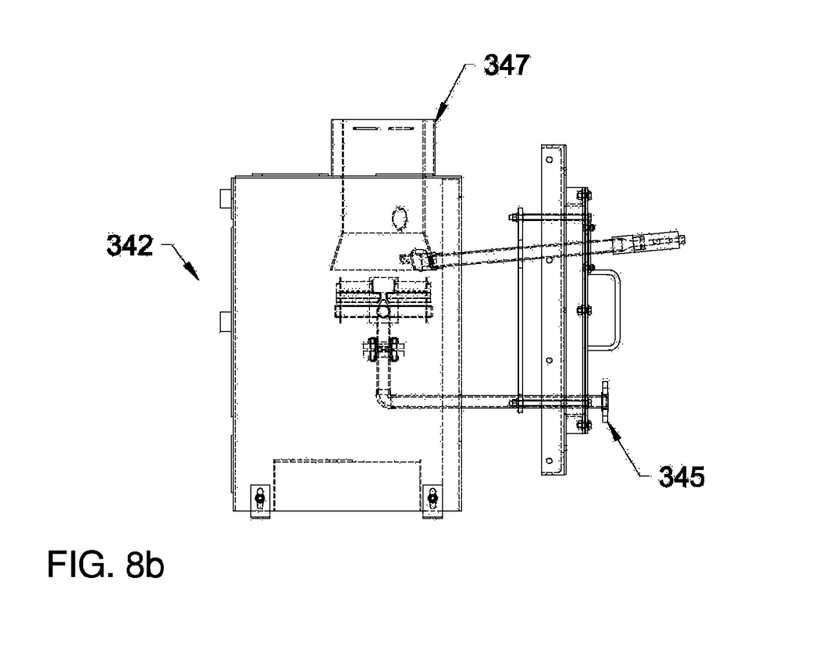

FIGS. 8*a* and 8*b* are detailed views of cooker unit describes above as unit 42 (FIG. 1), 242 (FIG. 3), and 342 (FIG. 6). Gas is supplied via tube 345 and is automatically ignited by pilot burner unit 343. The air/gas mixture is ignited and flames project from burner 347. Flame height is controlled by a fully modulating control valve and can be controlled remotely in response to the actions of the trainees.

Figure 9A:
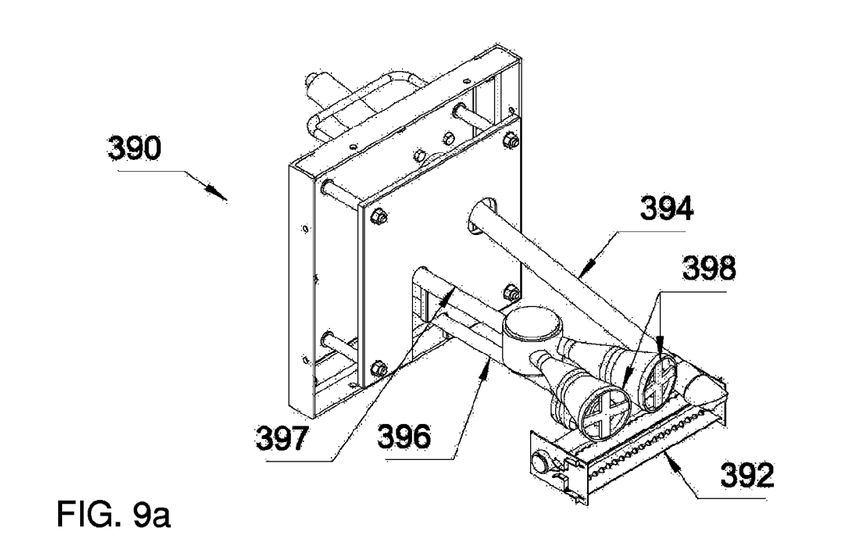
FIGS. 9a and 9b are detailed views of a torch for roll-over effects used in embodiments of the present disclosure.
Figure 9B:
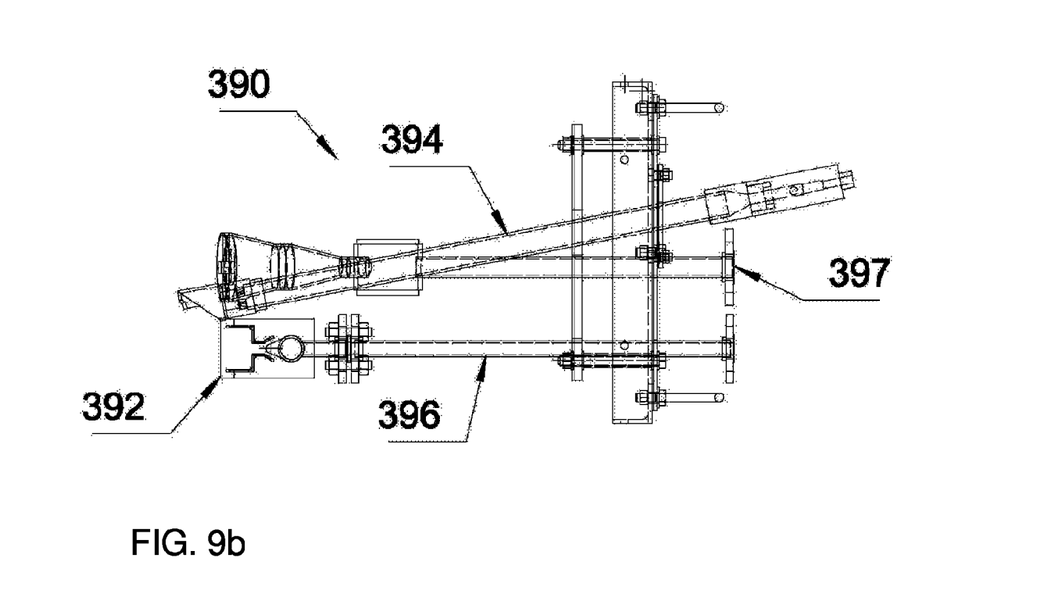

FIGS. 9*a* and 9*b* are detailed views of a torch for roll-over fire. The torch fire produces a flame which is of variable size and spreads flame across the ceiling of fire chamber 40 (FIG. 1), 240 (FIG. 3), or 340 (FIG. 6). The torch fire can either be introduced with a small flame and develop into a larger fire, or suddenly as a large fire depending on the effect required. Gas is supplied via tube 396 and burns at burner assembly 392. Automatic ignition is achieved by pilot burner 394. The roll-over effect is controlled using the jets 398.

Although the disclosure has been described with reference to certain embodiments, it will be appreciated by those skilled in the art that modifications and variations may be made without departing from the spirit and scope of the disclosure. It should be understood that applicant does not intend to be limited to the particular details described above and illustrated in the accompanying drawings. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A simulator for use in firefighting training exercises comprising:
    a. a fire compartment having a flame;
    b. a means for generating the flame;
    c. a means for generating smoke by incomplete combustion of fuel into said fire compartment comprising a conical combustion chamber; an inlet for said fuel into the combustion chamber wherein said inlet contains a nozzle connected to the combustion chamber; an inlet for air into the combustion chamber; an outlet from the combustion chamber for smoke; a means to supply the fuel directly into the conical combustion chamber wherein said means can vary the quantity of fuel supplied; a blower configured to introduce variable quantities of the air into the combustion chamber, where the combustion chamber has a multiple distribution of holes in the chamber wall to allow entry of the air;
    d. a control room for controlling the means for generating the flame and the means for generating smoke;
    e. a means for expelling said smoke from said fire compartment;
    f. a means for oxidizing said smoke; and
    g. a stack for releasing said oxidized smoke from said oxidizing means.

2. The simulator for use in firefighting training exercises of claim 1 further comprising an airlock chamber used by firefighting trainees to enter said compartment wherein the airlock chamber is held at a slightly higher ambient pressure than the fire compartment thereby preventing smoke from escaping said fire compartment when firefighting trainees enter said fire compartment.

3. The simulator for use in firefighting training exercises of claim 1 wherein said flame is generated using a liquid propane gas burner.

4. The simulator for use in firefighting training exercises of claim 1 wherein said means for generating the flame is by a flash-over torch.

5. The simulator for use in firefighting training exercises of claim 1 further comprising a smoke generation chamber which contains said means for generating smoke whereby smoke generated by the smoke generation means is directed into said fire compartment through a first series of ductwork.

6. The simulator for use in firefighting training exercises of claim 1 wherein said means for generating smoke is a smoke generator device which combusts an organic material.

7. The simulator for use in firefighting training exercises of claim 6 wherein said organic material is diesel oil.

8. The simulator for use in firefighting training exercises of claim 6 wherein the smoke generator device regulates the ratio of air-to-organic material to ensure incomplete combustion of the organic material thereby producing a black particulate smoke.

9. The simulator for use in firefighting training exercises of claim 1 wherein said means for oxidizing smoke is an oxidizer twit capable of incinerating said smoke.

10. The simulator for use in firefighting training exercises of claim 9 wherein said smoke incineration is the smoke being held at a temperature of approximately 815° C. with a residence time of about 2 seconds before being expelled through said stack.

11. The simulator for use in firefighting training exercises of claim 1 wherein said means for expelling said smoke from said fire compartment is a second series of ductwork to direct smoke to said means for oxidizing said smoke.

12. The simulator for use in firefighting training exercises of claim 11 wherein said second series of ductwork directs said smoke into a heat exchange unit before said smoke enters said means for oxidizing said smoke.

13. The simulator for use in firefighting training exercises of claim 12 wherein said second series of ductwork intersects said first series of ductwork and directs a portion of said smoke back into said fire compartment thereby recirculating smoke and heat to conserve energy.

14. The simulator for use in firefighting training exercises of claim 13 further comprising a valve to proportionally direct smoke into said first series of ductwork to recirculate said smoke into said fire compartment, and into said second series of ductwork to deliver smoke to said means for oxidizing said smoke.

15. The simulator for use in firefighting training exercises of claim 1 further comprising means for providing sound into said fire compartment.

16. The simulator for use in firefighting training exercises of claim 1 further comprising means for providing light into said fire compartment.

17. The simulator for use in firefighting training exercises of claim 15 wherein said control room controls the timing and volume of the sound.

18. The simulator for use in firefighting training exercises of claim 16 wherein said control room controls the timing and intensity of the light.

19. A simulator for use in firefighting training exercises comprising:
   a. a fire compartment having a flame;
   b. a means for generating the flame;
   c. an airlock chamber used by firefighting trainees to enter said fire compartment wherein the airlock chamber is held at a slightly higher ambient pressure than the fire compartment thereby preventing smoke from escaping said fire compartment when firefighting trainees enter said fire compartment;
   d. a means for generating smoke by incomplete combustion of fuel into said fire compartment comprising a conical combustion chamber; an inlet for said fuel into the combustion chamber wherein said inlet contains a nozzle connected to the combustion chamber; an inlet for air into the combustion chamber; an outlet from the combustion chamber for smoke; a means to supply the fuel directly into the conical combustion chamber wherein said means can vary the quantity of fuel supplied; a blower configured to introduce variable quantities of the air into the combustion chamber, where on chamber has a multiple distribution of holes in the chamber wall to allow entry of the air;
   e. a control room for controlling the means for generating the flame and the means for generating smoke;
   f. a means for expelling said smoke from said fire compartment;
   g. a means for oxidizing said smoke; and
   h. a stack for releasing said oxidized smoke from said oxidizing means.

20. A simulator for use in firefighting training exercises comprising:
   a. a fire compartment having a flame;
   b. a means for generating the flame;
   c. an airlock chamber used by firefighting trainees to enter said fire compartment wherein the airlock chamber is held at a slightly higher ambient pressure than the fire compartment thereby preventing smoke from escaping said fire compartment when firefighting trainees enter said fire compartment;
   d. a smoke generation chamber containing a means for generating smoke by incomplete combustion of fuel into said fire compartment comprising a conical combustion chamber; an inlet for fuel into the combustion chamber wherein said inlet contains a nozzle connected to the combustion chamber; an inlet for air into the combustion chamber; an outlet from the combustion chamber for smoke; a means to supply the fuel directly into the conical combustion chamber wherein said means can vary the quantity of fuel supplied; a blower configured to introduce variable quantities of the air into the combustion chamber, where the combustion chamber has a multiple distribution of holes in the chamber wall to allow entry of the air whereby smoke generated by the smoke generation means is directed into said fire compartment through a series of ductwork;
   e. a control room for controlling the means for generating the flame and the means for generating smoke;
   f. a means for expelling said smoke from said fire compartment;
   g. a means for oxidizing said smoke; and
   h. a stack for releasing said oxidized smoke from said oxidizing means.

21. The simulator for use in firefighting training exercises of claim 1, 19 or 20 further comprising the multiple distribution of holes having varying sizes.

* * * * *